United States Patent [19]

Schroeder

[11] Patent Number: 4,801,316
[45] Date of Patent: Jan. 31, 1989

[54] MOLDED FIBERGLASS AIR RETURN FILTER GRILLE

[75] Inventor: Clifford A. Schroeder, Westlake Village, Calif.

[73] Assignee: C. A. Schroeder, San Fernando, Calif.

[21] Appl. No.: 128,461

[22] Filed: Dec. 3, 1987

Related U.S. Application Data

[63] Continuation-in-part of Ser. No. 871,092, Jun. 5, 1986, Pat. No. 4,713,099.

[51] Int. Cl.$^4$ .............................................. B01D 46/10
[52] U.S. Cl. ...................................... 55/385.1; 55/493; 55/494; 55/480; 55/504; 55/DIG. 31
[58] Field of Search ....................... 55/385 R, 493–495, 55/480, 502, 504, 510, 527, DIG. 31

[56] References Cited

U.S. PATENT DOCUMENTS

| | | | |
|---|---|---|---|
| 3,003,581 | 10/1961 | Mreson | 55/527 X |
| 3,360,910 | 1/1968 | Soltis | 55/508 X |
| 3,570,220 | 3/1971 | Felter | 55/527 X |
| 3,782,082 | 1/1974 | Smith et al. | 55/504 X |
| 3,823,926 | 7/1974 | Bracich | 55/504 X |
| 4,088,463 | 5/1978 | Smith | 55/385 A X |
| 4,266,470 | 5/1981 | Schroeder et al. | 98/40.11 |
| 4,371,386 | 2/1983 | De Vecchi | 55/502 X |

Primary Examiner—Charles Hart
Attorney, Agent, or Firm—David O'Reilly

[57] ABSTRACT

An air return filter or air supply grille assembly having an interchangeable perforated face plate hingedly attached directly to a molded fiberglass plenum. The molded fiberglass plenum has a preformed recess for receiving and positioning a filter resting on the face plate when used as an air return filter grille assembly. The hinge system for the interchangeable perforated face plate is comprised of a pair of mating half hinges with one half secured to the plenum and the other half secured to each interchangeable face plate. The grille assembly can be mounted and a perforated face plate selected to provide an air return filter grille assembly or an air diffusing supply grille assembly. The air filter grille assembly is constructed to mount easily on T-bar suspended ceilings with the perforated face plate held closed by manually rotatable pawls.

16 Claims, 5 Drawing Sheets

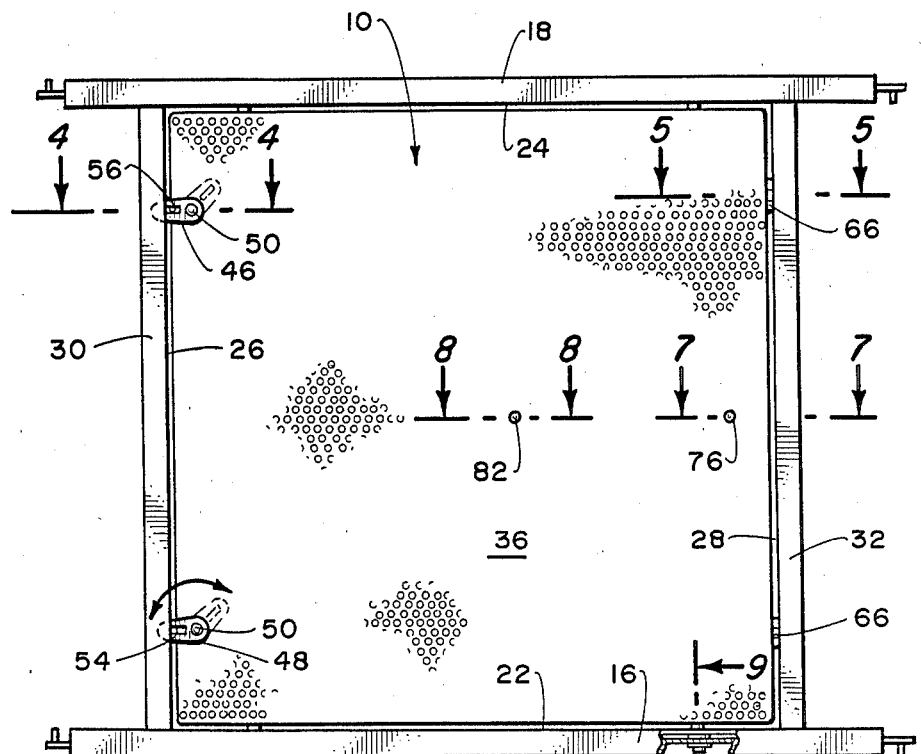
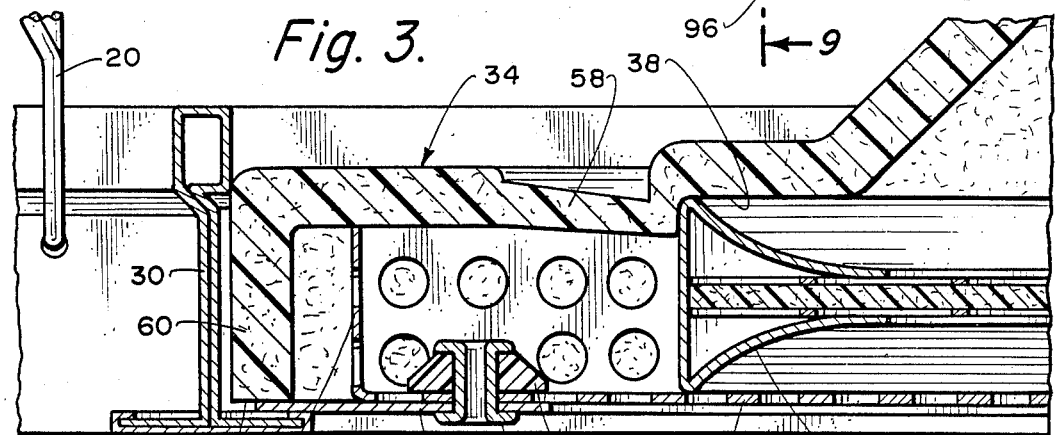
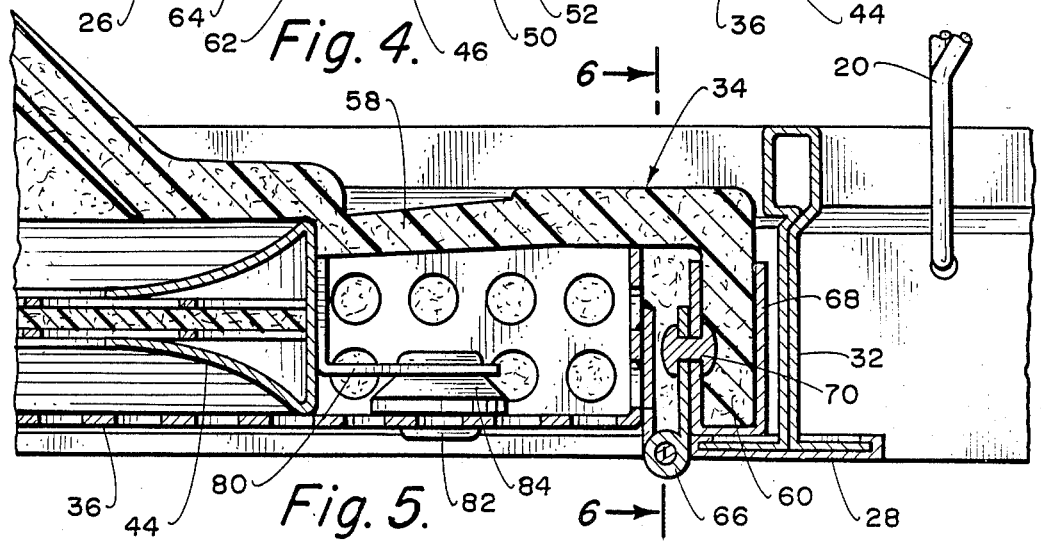

MOLDED FIBERGLASS AIR RETURN FILTER GRILLE

This application is a continuation-in-part of application Ser. No. 871,092, filed June 5, 1986, now U.S. Pat. No. 4,713,099, issued Dec. 15, 1987.

FIELD OF THE INVENTION

This invention relates to air return filter grilles and more particularly relates to a molded fiberglass air return filter grille having a molded fiberglass plenum with foil reinforcement and a grille hinged directly to the plenum.

BACKGROUND OF THE INVENTION

Air return filter grilles are comprised of a plenum which may be sheet metal or fiberglass, attached to a metal frame mounted in ceilings, walls, and sometimes mounted on T-bar ceilings. The frames are constructed usually of aluminum or sheet metal with a perforated face plate or grate hingedly attached on one side, closed and held in place by screws on the side opposite the hinge. The sheet metal frame has a cavity or recess for mounting a filter behind the face plate. Besides being quite heavy in construction, the replacement of the filters require special tools for releasing the screws holding the face plate in position. Another disadvantage is that the substantial metal construction can make them noisy when air is flowing through the return filter. Also the cost, weight and bulk of metal construction are additional substantial disadvantages.

It is therefore one object of the present invention to provide an air return filter mounting grille substantially lightweight in construction.

Yet another object of the present invention is to provide an air return filter grille, having a unique molded fiberglass plenum with foil reinforcement.

Yet another object of the present invention is to provide a lightweight air return filter grille, having high acoustical absorption, surpassing the substantial steel or metal units presently in use.

Still another object of the present invention is to provide an air return filter grille which makes it easy to change the filter without the need for special tools or equipment.

Yet another object of the present invention is to provide an air return filter grille having an unique fiberglass construction with the perforated face plate attached by a hinge directly to the molded fiberglass to provide a substantial reduction in weight and allow easy mounting on T-bar ceilings.

Still another object is to construct an air return filter grille which mounts flush in T-bar suspended ceilings and matches air supply units in appearance. The unique construction provides a clean uncluttered design without the usual metal frame around the perforated metal face.

Yet another object of the present invention is to provide an air system grille assembly having a unique fiberglass construction with a perforated face plate attached by a separable split hinge directly to the molded fiberglass to provide a substantial reduction in weight and allow easy mounting on T-bar ceilings. The separable split hinge allows the system to be used for an air return filter grille, or for an air supply system by removing and exchanging perforated face plates.

BRIEF DESCRIPTION OF THE INVENTION

The purpose of the present invention is to provide an improved air return filter grille that is lightweight in construction designed for easy replacement of filters without the need for tools or special equipment.

The air return filter grille of the present invention is comprised of a unique molded fiberglass plenum having a foil reinforced upper surface for connecting the plenum to a flexible air duct. A recess is molded into the plenum for receiving up to a one inch filter. The plenum dimensions are such that it will fit comfortably on the flange of bars forming suspended T-bar ceilings. The plenum is secured against movement on the T-bar by at least one flexible sheet metal tab on either side constructed to bend around the rib of a T-bar and be fastened by a sheet metal screw.

The entrance or opening to the plenum is closed by a perforated sheet metal face plate hingedly attached to the molded fiberglass plenum. The hinges are supported by a sheet metal channel clamped securely along one skirted edge of the fiberglass plenum. One side of the hinge is securely riveted or welded to the sheet metal channel while the other is riveted or welded to a flanged border on the perforated sheet metal face plate. The sheet metal channel is secured along the skirted edge of the fiberglass plenum with rivets or teeth formed by punching the sides of the sheet metal channel. The perforated face plate hinges and sheet metal channel form the only metal parts of the air return filter grille.

Mounted on the perforated face plate are a filter stop for positioning a filter in the perforated face plate and a spring for securely holding the filter against the recess in the plenum when the perforated face plate is closed. An additional, but unique feature of this system, is the inclusion of pawls which hold the perforated face plate closed by engaging the T-bar flange. Two such pawls are sufficient to hold the perforated face plate closed with the filter properly positioned in the recess in the plenum. The pawls are formed with large slots allowing them to be easily rotated by hand, a coin or similar object. Thus no special tools are necessary for opening the face plate to remove and replace the filter.

In an alternate embodiment of the grille assembly, the perforated face plate is attached by a separable split hinge directly to the molded fiberglass plenum. This construction allows the molded fiberglass plenum to be used for either air return or air supply purposes. The split hinge allows the face plate to be easily removed for exchange with a perforated face plate having a stop for positioning a filter when used as an air return filter grille, or changed to a perforated face plate having adjustable louvers such as those disclosed and described in U.S. Pat. No. 4,266,470. The latter separable hinge construction allows the assembly to be quickly and easily changed to an air diffuser or air supply system.

The above and other features of the invention will be more fully understood from the following detailed description and the accompanying drawings, in which:

BRIEF DESCRIPTION OF THE DRAWINGS

FIG. 3 is a bottom view of the air filter grille assembly mounted on a T-bar construction.

FIG. 4 is a sectional view taken at 4—4. of FIG. 3.

FIG. 5 is a sectional view taken at 5—5. of FIG. 3.

DETAILED DESCRIPTION OF THE INVENTION

Figure 1:
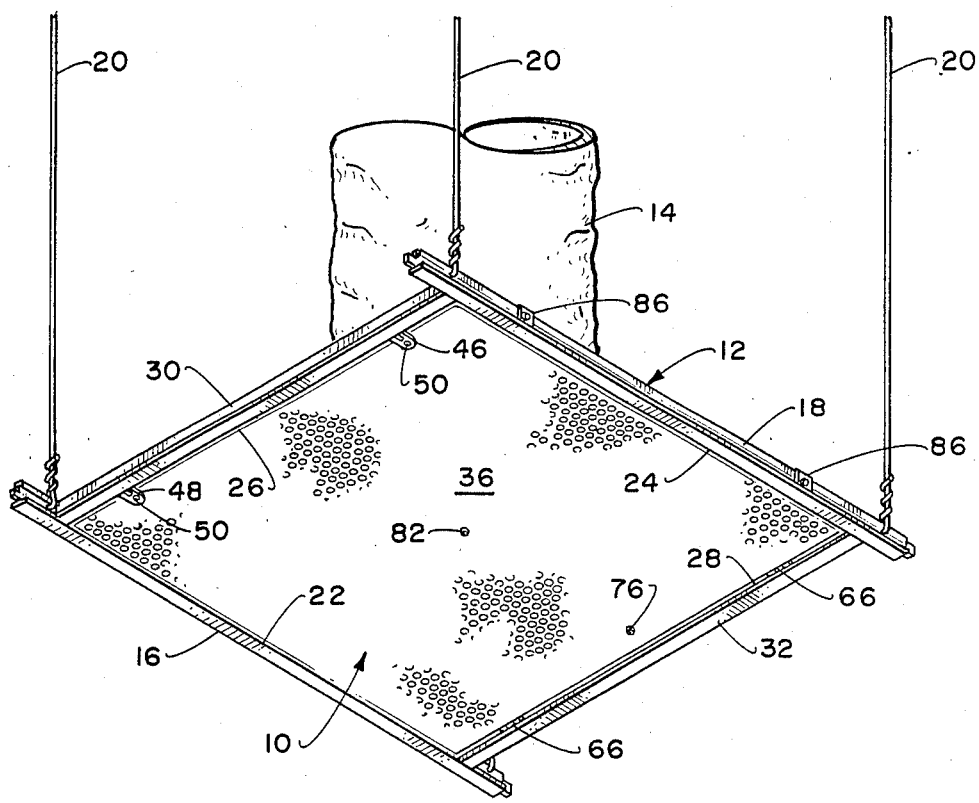
FIG. 1 is a perspective view of the air return filter grille constructed according to the invention.

Referring to FIG. 1 an air return filter grille assembly 10 constructed according to the invention is shown mounted on a suspended T-bar ceiling 12, connected to a flexible duct 14. The T-bar ceiling 12 is a suspended ceiling comprised of joists 16 and 18, suspended on wires or cables 20 secured to a solid surface or roof (not shown). The air return filter grille 10 is supported on flanges 22 and 24 on the joist 16 and 18 and on flanges 26 and 28 forming a part of crossbars 30 and 32 respectively. The air return filter grille 10 is secured to the suspended t-bar ceiling as will be described in greater detail hereinafter.

Figure 2:
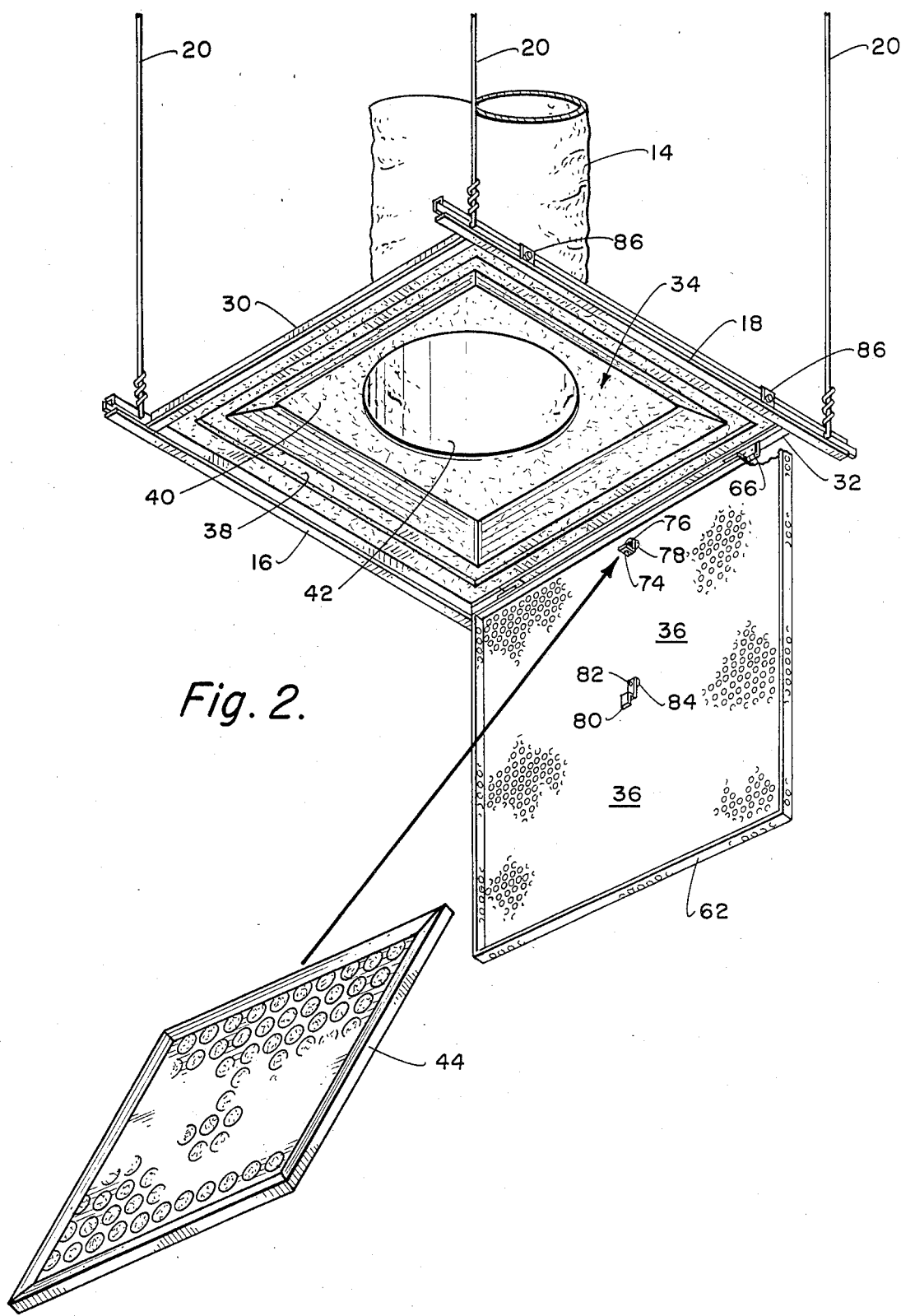
FIG. 2 is a perspective view of the air return filter grille with the perforated face plate open for installing a filter.

Air return filter grille assembly 10 has a unique very simple construction with a minimum of lightweight metal parts. In FIG. 2, air return filter grille 10 is shown comprised of a unique molded fiberglass plenum 34, having a perforated face plate 36, hingely attached directly to a skirted edge of the plenum. Molded fiberglass plenum 34 is uniquely molded to comfortably fit on a suspended T-bar construction and has a recess 38, constructed to receive half to one inch filters 44, supported by perforated face plate 36. Filter 44 lies on face plate 36, which when closed securely holds the filter in recess 38. Molded fiberglass plenum then tapers toward an upper surface 40 where the plenum is connected to duct 14 through hole 42.

It should be noted that the exterior of surface 40 is reinforced with foil 45 (FIG. 9) prescored for receiving flexible duct connections of from six to fourteen inches. This construction is similar to that shown and described in U.S. Pat. No. 4,266,470 issued May 12, 1981. As in this patent the reinforcing foil 45 protects the edges of hole 42 from fraying and provides a secure surface for connecting duct 14 to the plenum with duct tape (not shown) if desired.

A bottom view of the air return filter grille is shown in FIG. 3 with face plate 36 closed and held in place by pawls 46 and 48, rotably mounted on face plate 36. The pawls 46 and 48 are secured to face plate 36 by rivets 50 and resilient spacers 52, allowing the pawls 46, 48 to easily rotate. Slots 54 and 56 formed in the pawls 46, 48 are made large enough so they can be easily rotated manually or with a coin, or similar object eliminating the need for any special tools to open the face plate and replace filter 44.

As can be seen in FIG. 4, filter 44 snugly fits into recess 38 formed in the molded fiberglass plenum. Recess 38 is formed in the plenum during the molding and is strengthened by slightly increasing the compression of the molded fiberglass at area 58 around the periphery of the recess. Skirt 60 on fiberglass plenum 34 provides a cavity for receiving flanged border 62 of face plate 36 so that face plate 36 is flush with lower edge 64 of the molded fiberglass plenum when closed.

Figure 6:
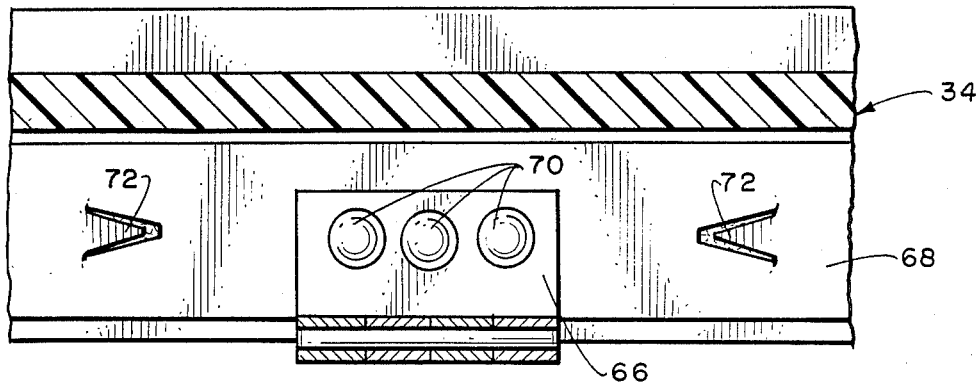
FIG. 6 is a sectional view taken at 6—6 of FIG. 5.
Figure 7:
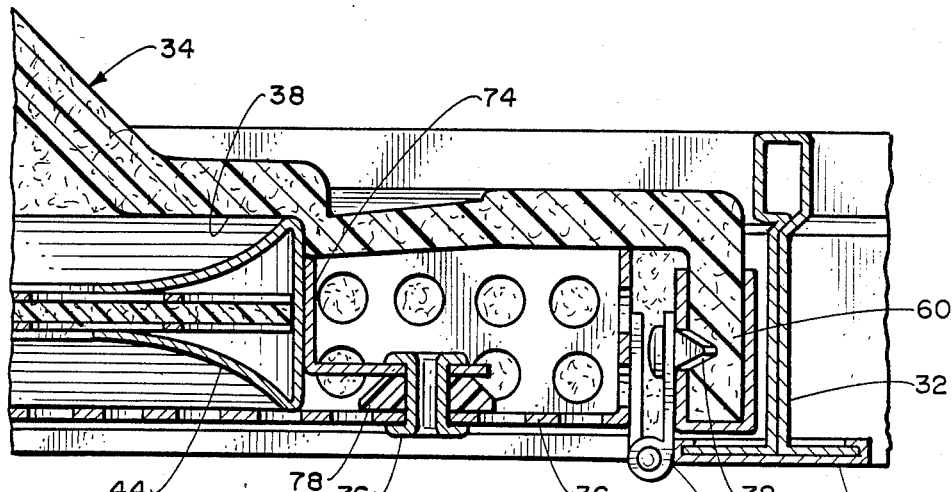
FIG. 7 is a sectional view taken at 7—7 of FIG. 3.
Figure 8:
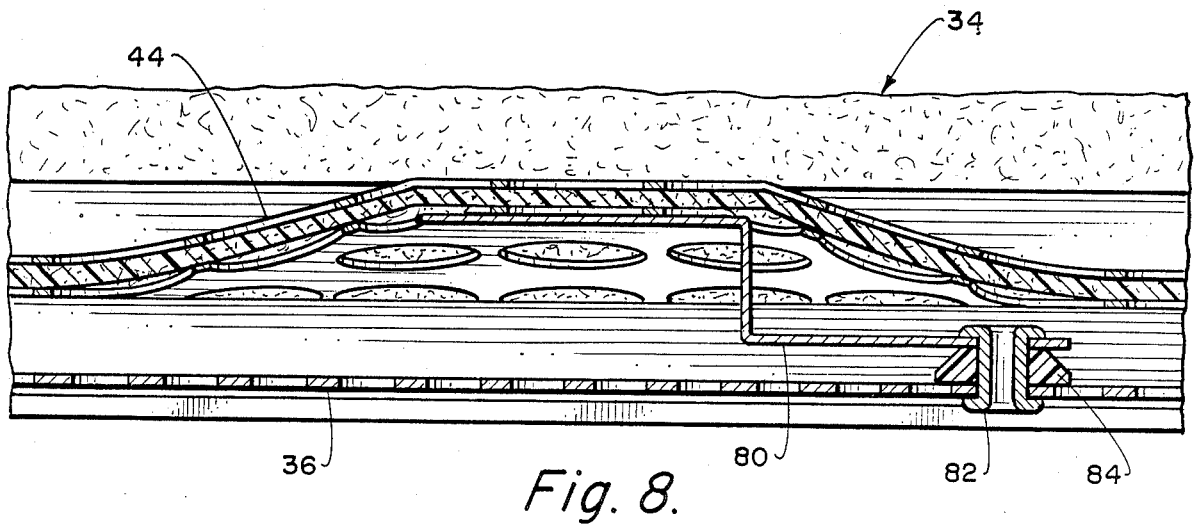
FIG. 8 is a sectional view taken at 8—8 of FIG. 3.
Figure 10:
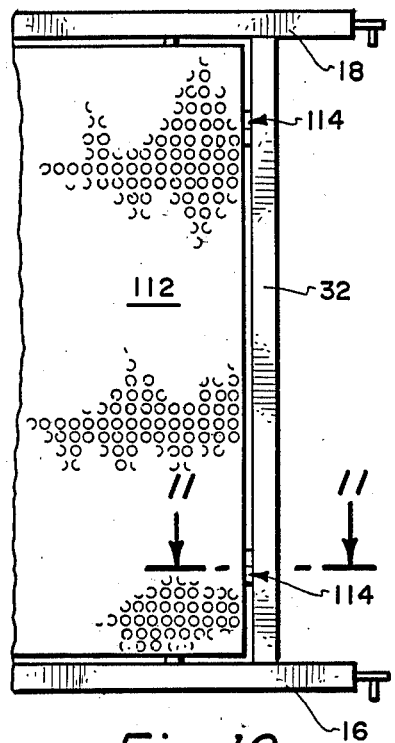
FIG. 10 is a partial bottom view of an alternate embodiment of a grille assembly mounted on a T-bar construction.
Figure 11:
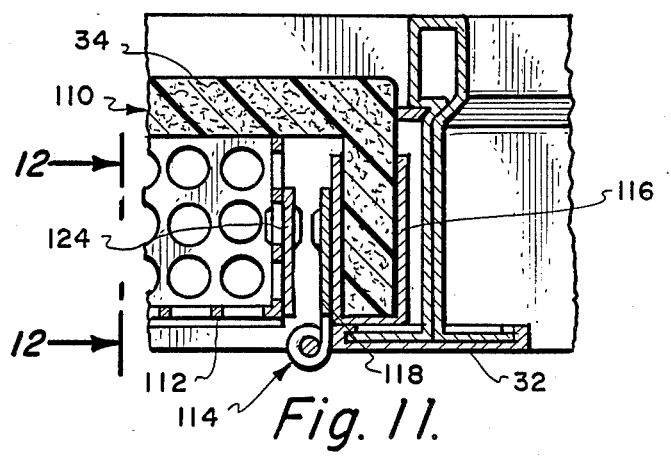
FIG. 11 is a sectional view taken at 11—11 of FIG. 10, showing a separable split hinge construction.
Figure 12:
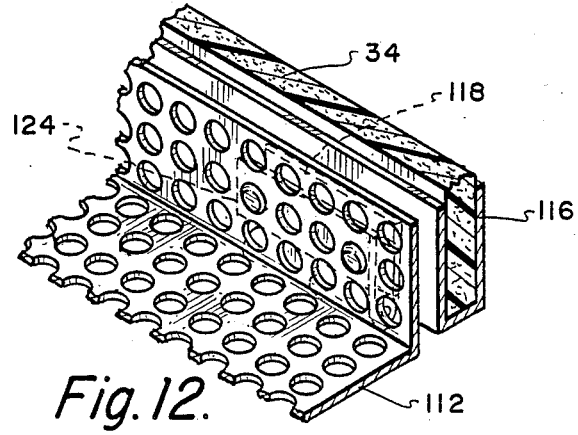
FIGS. 12 through 14 are partial sectional views in perspective, illustrating the operation of the separable split-hinge to use interchangeable perforated face plates.
Figure 13:
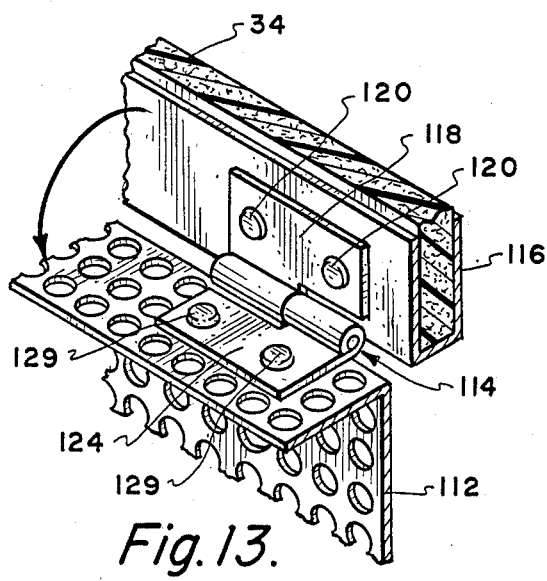

Perforated face plate 36 is attached to molded fiberglass plenum 34 by hinges 66 and sheet metal channel 68. Channel 68 having hinges 66 attached by rivets or welded 70 is mounted on skirt 60 of fiberglass plenum 34 by clamping the channel against the molded compressed fiberglass of the skirt. Additional gripping of the sheet metal channel 68 is provided by punching teeth 72 in the sheet metal which bite into the fiberglass of skirt 60 (FIG. 6). Perforated face plate 36 is secured to hinge 66 by spot welding.

Filter 44 is positioned on perforated face plate 36 by stop 74 secured to the face plate by rivet 76 and resilient spacer 78. To install the filter it is placed on face plate 36 in abutment with stop 74 as shown in FIG. 2.

Filter 44 is held firmly in place in recess 38 by a resilient leaf spring 80, also secured to perforated face plate 36 by a rivet 82 and resilient spacer 84. Spring 80 is configured to press against the surface of filter 44 maintaining the edges of filter in firm engagement with recess 38. This prevents any air from entering the duct that does not pass through filter 44. The leaf spring also keeps the filter in position as the unit cycles on and off thus preventing accumulating dust from shaking loose.

Figure 9:
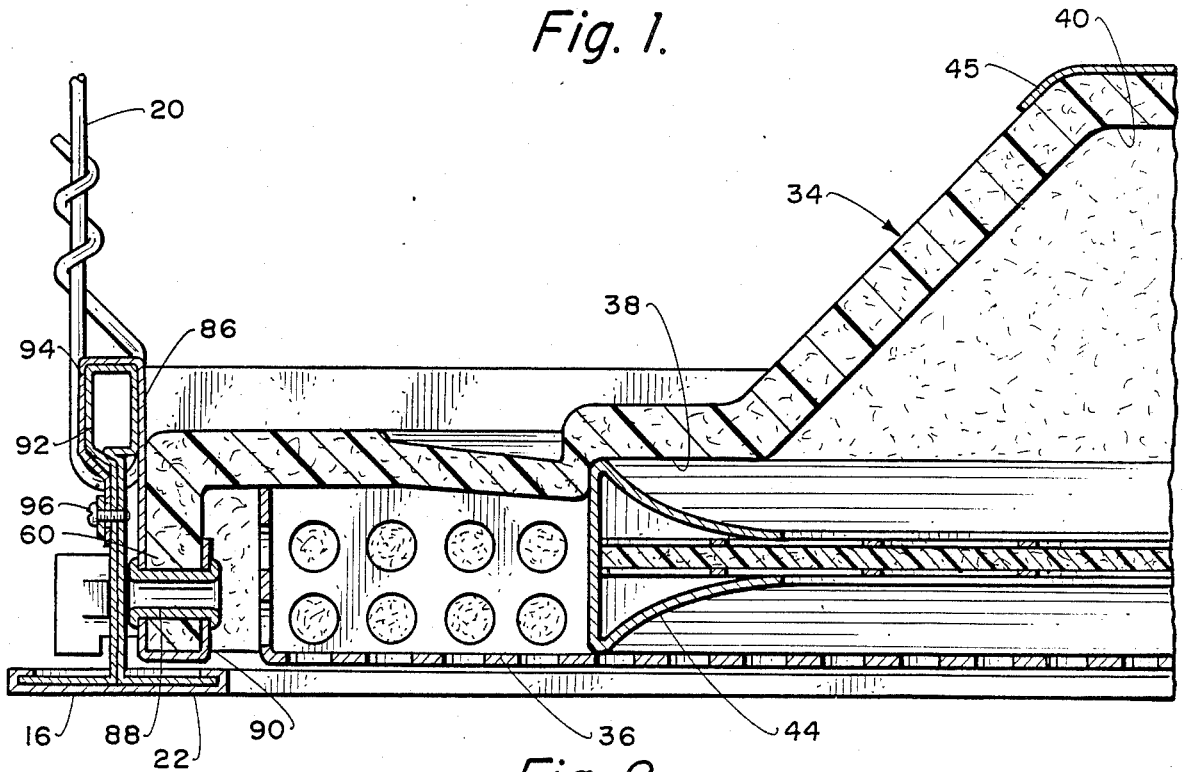
FIG. 9 is a sectional view taken at 9—9 of FIG. 3.

The mounting of the air return filter assembly in the suspended T-bar ceiling is illustrated in FIG. 9. Molded fiberglass plenum skirt 60 rests on flange 22 of joist 16. Likewise the other skirt portions of molded fiberglass plenum 34 rest on the respective flanges of the other joist and T-bar cross members. The molded fiberglass plenum is then secured against movement by thin sheet metal tabs 86 bent around skirt 60 as shown at 90 and secured by rivets 88. The sheet metal tab 86 is also bent around joist rib 92 as shown at 94 and secured by a sheet metal screw 96. This minimizes movement and vibrations of the air return filter grille assembly.

FIGS. 10 through 14 illustrate an alternate embodiment of the grille assembly shown in FIGS. 1 through 9. The grille assembly of this embodiment uses the same plenum 34 as in the previous embodiment and is constructed to fit the T-bar construction having joists 16 and 18 and crossbar 32. However, in this embodiment the perforated face plate of the grille assembly 110 is interchangeable from an air return filter face plate to a louvered air supply face plate.

Perforated face plate 112 is mounted on plenum 34 by a hinge 114 attached to metal channel 116 secured to plenum 34 by rivets as before. However, in this embodiment hinge 114 is a separable split-hinge as can be seen more clearly in FIGS. 12 through 14. Hinge 114 is comprised of socket half 118 fastened be rivets 120 to channel 116 and has a cylindrical socket 122. The second half of hinge 114 is comprised of a plate 124 secured by rivets 129 to face plate 112. Plate 124 has a hinge pin 126 fitting aperture 128 in hinge socket 122. Thus, the grille assembly can be quickly and easily changed from an air return filter grille assembly as illustrated in FIG. 2, to an air supply filter grille assembly by simply opening the grille and sliding pins 126 from each socket 122.

Figure 14:
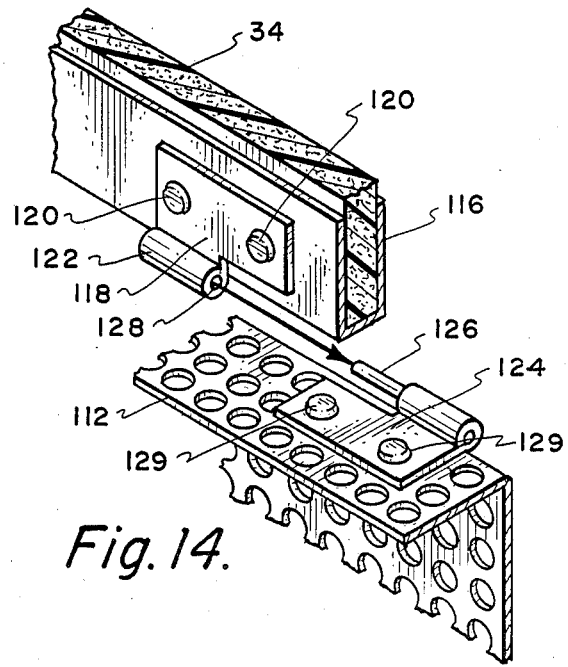

Thus, the same plenum and assembly arrangement can be used to convert the air filter assembly of FIG. 2, to an air return assembly. The change is accomplished by simply detaching the perforated face plate by separating the hinges and replacing the face plate with the appropriate assembly. For an air return, a perforated face plate 34 having pinned half hinges as shown in FIG. 14 is slipped into the mating half hinge. For an air supply, a perforated face plate 12 having a half hinge as shown in FIG. 14 is fitted into the socket. Preferably a perforated face plate 112 for use as air supply may have adjustable louvers as shown and described in U.S. Pat. No. 4,266,470 incorporated herein by reference.

Thus, the system disclosed can use the same plenum for either an air supply grille assembly or air return filter grille assembly by simply and quickly removing and changing the perforated face plate. For an air return filter grille, a perforated face plate as shown in FIG. 2 is installed using the split separable hinge with stop 74 and leafspring 80. For an air supply, a perforated face plate 112 having adjustable louvers and a half hinge is inserted in the hinges mounted on the plenum, as shown in FIGS. 10 through 14.

Thus, there has been described a novel and unique air return filter grille assembly or air supply grille assembly comprised of a unique molded fiberglass plenum having an interchangeable perforated face plate attached directly to the plenum. A perforated face plate is connected directly to the molded fiberglass plenum by a sheet metal channel mounted on the plenum skirt, having separable hinges mounted on the plenum and the perforated face plate. The molded fiberglass plenum has a recess for receiving a filter and unique pawls holding the selecting interchangeable perforated face plate in position against the plenum when mounted on a suspended T-bar ceiling.

This invention is not to be limited by the embodiment shown in the drawings or described in the description, which is given by way of example and not of limitation but only in accordance with the scope of the appended claims.

What is claimed is:

1. An air return filter grille assembly comprising:
    a molded fiberglass plenum having an open side surrounded by a skirt;
    a filter receiving recess formed in said molded fiberglass plenum for receiving a filter;
    a perforated face plate fitting the open side of said plenum;
    separable hinge means hingedly mounting said perforated face plate on said fiberglass plenum so that said perforated face plate can be easily swung open to allow access to the interior of said molded fiberglass plenum;
    latch means on said perforated face plate for holding said face plate in a closed position against said open side of said molded fiberglass plenum;
    said separable hinge means comprised of a split hinge, one half of said hinge having a socket and a mating half of said hinge having a pin;
    one half of said hinge being secured to said molded fiberglass plenum and the other half of said hinge being secured to said interchangeable perforated face plate;
    whereby said molded fiberglass plenum may be used as an air return filter grille assembly or air diffusing supply grille assembly by removing and changing said interchangeable perforated face plate.

2. The grille assembly according to claim 1 in which said hinge means comprises;
    channel means mounted on said skirt along one side of said molded fiberglass plenum;
    at least one of said half-hinge secured to said channel and said perforated face plate.

3. The grille assembly according to claim 2 in which said channel is a sheet metal channel securely clamped to said skirted edge of said fiberglass plenum.

4. The grille assembly according to claim 3 in which said sheet metal channel includes teeth which bite into the molded fiberglass to hold said channel on said molded fiberglass plenum.

5. The grille assembly according to claim 4 in which said teeth are formed by punching said sheet metal channel.

6. The grille assembly according to claim 6 including means for holding said perforated face plate closed against said open side of said molded fiberglass plenum.

7. The grille assembly according to claim 6 in which said means for holding said perforated face plate closed comprises pawl means rotatably mounted on said perforated face plate.

8. The grille assembly according to claim 7 in which said molded fiberglass plenum is constructed to be mounted on suspended T-bar ceilings;
    said pawl means constructed and arranged to engage a flange on a T-bar of said T-bar ceiling thereby holding said perforated face plate in a closed position.

9. The grille assembly according to claim 8 in which said pawl means comprises a pair of spaced apart pawls.

10. The grille assembly according to claim 1 including filter positioning means on said interchangeable perforated face plate.

11. The grille assembly according to claim 10 in which said filter positioning means comprises an abutment stop adapted to abut one side of said filter when placed on said perforated face plate.

12. The grille assembly according to claim 11 including leaf spring means mounted on said perforated face plate for holding a filter firmly in said filter reclining recess.

13. The grille assembly according to claim 8 including means for securing said molded fiberglass plenum against movement when mounted on said suspended T-bar ceiling.

14. The grille assembly according to claim 8 in which said securing means comprises at least one bendable sheet metal strip attached to said skirt on opposite sides of said molded fiberglass plenum;
    said bendable sheet metal strips adapted to be bent over a rib of said T-bars and secured with a sheet metal screw.

15. The grille assembly according to claim 1 in which said interchangeable perforated face plate in an air diffusing perforated face plate.

16. The grille assembly according to claim 1 in which said air duffusing perforated face plate has a plurality of adjustable louvers for adjusting the direction of air flow.

* * * * *